(12) United States Patent
Wu et al.

(10) Patent No.: US 12,201,250 B2
(45) Date of Patent: Jan. 21, 2025

(54) METHOD AND APPARATUS FOR CONSTRUCTING MAP OF WORKING REGION FOR ROBOT, ROBOT, AND MEDIUM

(71) Applicant: Beijing Roborock Innovation Technology Co., Ltd., Beijing (CN)

(72) Inventors: Erqi Wu, Beijing (CN); Yansheng Niu, Beijing (CN); Shuai Liu, Beijing (CN)

(73) Assignee: BEIJING ROBOROCK INNOVATION TECHNOLOGY CO., LTD., Beijing (CN)

( * ) Notice: Subject to any disclaimer, the term of this patent is extended or adjusted under 35 U.S.C. 154(b) by 494 days.

(21) Appl. No.: 17/601,026

(22) PCT Filed: Apr. 2, 2020

(86) PCT No.: PCT/CN2020/083000
§ 371 (c)(1),
(2) Date: Oct. 1, 2021

(87) PCT Pub. No.: WO2020/200282
PCT Pub. Date: Oct. 8, 2020

(65) Prior Publication Data
US 2022/0167820 A1 Jun. 2, 2022

(30) Foreign Application Priority Data
Apr. 2, 2019 (CN) .......................... 201910261018.X (51) Int. Cl.
*A47L 11/40* (2006.01)
*G01S 17/931* (2020.01)
(Continued)

(52) U.S. Cl.
CPC .......... *A47L 11/4011* (2013.01); *G01S 17/931* (2020.01); *G05D 1/024* (2013.01);
(Continued)

(58) Field of Classification Search
CPC ............. A47L 11/4011; A47L 2201/04; G01S 17/931; G01S 17/86; G05D 1/024;
(Continued)

(56) References Cited

U.S. PATENT DOCUMENTS 6,847,435 B2 * 1/2005 Honda .................. G01S 7/4813
356/141.5
7,187,452 B2 * 3/2007 Jupp ....................... G01S 7/497
356/3.01
(Continued)

FOREIGN PATENT DOCUMENTS

| CN | 1782668 A | 6/2006 |
|---|---|---|
| CN | 101480795 A | 7/2009 |

(Continued)

OTHER PUBLICATIONS

Office Action issued in corresponding European Patent Application No. 20784889.6 dated Oct. 23, 2023.
(Continued)

*Primary Examiner* — Redhwan K Mawari
(74) *Attorney, Agent, or Firm* — Morgan, Lewis & Bockius LLP (57) ABSTRACT

A robot (100) working area map construction method and apparatus, a robot (100), and a medium, wherein the robot (100) working area map construction method comprises scanning in real time an obstacle in a driving path and recording position parameters of the obstacle (S102); obtaining in real time image information of the obstacle in the driving path (S104); according to the position parameters and the image information, determining working area-based reference information of the obstacle (S106); and dividing the working area into a plurality of sub-areas on the basis of the reference information (S108). By means of radar scanning and image capture by a camera for double insurance, the robot (100) working area map construction method
(Continued)

significantly improves recognition accuracy for room doors and avoids room division confusion caused by the incorrect recognition of doors.

15 Claims, 6 Drawing Sheets (51) Int. Cl.
  *G05D 1/00* (2006.01)
  *G06T 7/13* (2017.01)
(52) U.S. Cl.
  CPC ......... *G05D 1/0248* (2013.01); *G05D 1/0274* (2013.01); *G06T 7/13* (2017.01); *A47L 2201/04* (2013.01); *G06T 2207/30261* (2013.01)
(58) Field of Classification Search
  CPC ...... G05D 1/0248; G05D 1/0274; G06T 7/13; G06T 2207/30261; G06V 10/44; G06V 20/50
  See application file for complete search history.

(56) References Cited

U.S. PATENT DOCUMENTS

| | | | |
|---|---|---|---|
| 7,796,782 B1* | 9/2010 | Motamedi | G01C 5/00 382/106 |
| 9,096,206 B2* | 8/2015 | Linkenbach | B60T 13/662 |
| 10,930,015 B2* | 2/2021 | Raag | G06T 7/13 |
| 11,069,082 B1* | 7/2021 | Ebrahimi Afrouzi | H04N 23/56 |
| 11,281,916 B2* | 3/2022 | Heenan | G06V 20/56 |
| 2003/0066949 A1* | 4/2003 | Mueller | H04N 13/254 348/E13.016 |
| 2005/0280802 A1* | 12/2005 | Liu | G01C 15/004 356/5.01 |
| 2010/0235129 A1 | 9/2010 | Sharma et al. | |
| 2012/0083982 A1* | 4/2012 | Bonefas | G05D 1/0223 382/153 |
| 2012/0143372 A1 | 6/2012 | Roh | |
| 2013/0058527 A1 | 3/2013 | Peynot et al. | |
| 2015/0223659 A1 | 8/2015 | Han et al. | |
| 2016/0100522 A1* | 4/2016 | Yamauchi | G05D 1/0219 701/25 |
| 2017/0122749 A1 | 5/2017 | Urano et al. | |
| 2018/0178772 A1* | 6/2018 | Foitzik | B60T 8/4081 |
| 2018/0178773 A1* | 6/2018 | Foitzik | B60T 13/745 |
| 2018/0334155 A1* | 11/2018 | Feigel | B60T 17/221 |
| 2018/0364870 A1 | 12/2018 | Mei | |
| 2019/0025838 A1* | 1/2019 | Artes | G05D 1/0246 |
| 2019/0188498 A1* | 6/2019 | Revilloud | G01S 17/931 |
| 2019/0248396 A1* | 8/2019 | Khosla | B61L 27/10 |
| 2019/0295291 A1* | 9/2019 | Raag | G06T 7/85 |
| 2020/0145588 A1* | 5/2020 | Kasuya | G06T 7/70 |
| 2020/0368486 A1* | 11/2020 | Hansmann | A61M 16/201 |
| 2021/0053543 A1* | 2/2021 | Seol | B60T 7/042 |
| 2021/0357661 A1* | 11/2021 | Heenan | G06T 7/97 |
| 2022/0081873 A1* | 3/2022 | Huissoon | E02F 9/205 |
| 2022/0342421 A1* | 10/2022 | Kearns | G05D 1/0219 |

FOREIGN PATENT DOCUMENTS

| | | | | |
|---|---|---|---|---|
| CN | 102018481 A | 4/2011 | | |
| CN | 102254190 A | 11/2011 | | |
| CN | 1104470685 A | 3/2015 | | |
| CN | 104825101 A | 8/2015 | | |
| CN | 106175606 A | 12/2016 | | |
| CN | 106239517 A | 12/2016 | | |
| CN | 106595682 A | 4/2017 | | |
| CN | 106737653 A | 5/2017 | | |
| CN | 106863305 A | 6/2017 | | |
| CN | 106983449 A | 7/2017 | | |
| CN | 107330925 A | 11/2017 | | |
| CN | 107817509 A | 3/2018 | | |
| CN | 108303092 A | 7/2018 | | |
| CN | 108509972 A | 9/2018 | | |
| CN | 108873880 A | 11/2018 | | |
| CN | 108885453 A | 11/2018 | | |
| CN | 109188459 A | 1/2019 | | |
| CN | 109947109 A | 6/2019 | | |
| CN | 109947109 B | 6/2022 | | |
| GB | 2552251 A | * | 1/2018 | ............ B62D 13/06 |
| KR | 10-2009-0048104 A | 5/2009 | | |
| WO | 2019/053062 A1 | 3/2019 | | |
| WO | WO-2022185232 A1 | * | 9/2022 | ............ B25J 13/086 |

OTHER PUBLICATIONS

Extended European Search report dated Nov. 29, 2022, issued in corresponding European Patent Application No. 20784889.6.
International Search Report issued in corresponding International Patent Application No. PCT/CN2020/083000 dated Jun. 30, 2020.
Wang et al., "Obstacles Detection Based on Laser Ranging Radar and Machine Vision," China Academic Journal Electronic Electronic Publishing House, 25-29 (2012) (see English abstract).
Chi et al., "Research on SI Multaneous Localization and Mapping of Mobile Robot," Robot, 26 (1): 92-96 (2004) (see English abstract).
Notification to Grant Patent Right issued in counterpart Chinese Patent Application No. 201910261018.X dated Mar. 14, 2022.

* cited by examiner

METHOD AND APPARATUS FOR CONSTRUCTING MAP OF WORKING REGION FOR ROBOT, ROBOT, AND MEDIUM

CROSS-REFERENCE TO RELATED APPLICATIONS

The present application is the 371 application of PCT Application No. PCT/CN2020/083000, filed Apr. 2, 2020, which claims priority to Chinese Patent Application No. 201910261018.X filed on Apr. 2, 2019, the content of both of which is incorporated herein by reference in its entirety.

TECHNICAL FIELD

The present disclosure relates to the field of control technologies, and in particular to a method and an apparatus for constructing a map of a working region for a robot, a robot, and a medium.

BACKGROUND

With the development of technologies, various intelligent robots have appeared, such as sweeping robots, mopping robots, vacuum cleaners, and weeding machines. These robots can receive user-input voice instructions through a speech recognition system to perform operations indicated by the voice instructions, which not only liberates the workforce but also saves labor costs.

Common sweeping robots use inertial navigation, lidars, or cameras for map planning and navigation. When users use sweeping robots to sweep the floor, they see division of a to-be-swept region in real time on mobile devices. However, such division of the to-be-cleaned region is not unit-based division of a room. The division is to randomly divide the to-be-cleaned region into a plurality of areas based only on coordinate information of the to-be-cleaned region.

As needs of users gradually increase, the foregoing conventional display methods can no longer meet the needs of users. In some specific conditions, for example, the living room area of the house is an area where walking often occurs. When the user wants to set the robot to sweep the living room area, the foregoing natural division method brings trouble to the user because the map is formed in real time and it is difficult for the user to make the robot go directly to the to-be-swept region during the next sweeping.

The common map formation method cannot effectively divide the room, and the user cannot accurately specify a specific to-be-swept room. For example, the living room is an area where activities often occur and there is a lot of dust. Consequently, the user cannot clearly and accurately instruct the sweeping robot to go to the living room and sweep the entire living room area. The existing technologies can only support the robot in reaching the living room area but cannot ensure that the robot sweeps the entire living room area after arrival.

Therefore, it is necessary to provide a method for enabling the robot to divide the room area, so that the user can accurately instruct the robot to go to an accurate area for sweeping.

It should be noted that the information disclosed in the BACKGROUND section is used only to enhance an understanding of the background of the present disclosure, and therefore may include information that does not constitute prior art known to persons of ordinary skill in the art.

SUMMARY

In view of the previous description, embodiments of the present disclosure provide a method and an apparatus for constructing a map of a working region for a robot, a robot, and a storage medium.

According to a first aspect, embodiments of the present disclosure provide a method for constructing a map of a working region for a robot, where the method includes:

scanning an obstacle in a driving path in real time, and recording a location parameter of the obstacle;

obtaining image information of the obstacle in the driving path in real time;

determining reference information of the obstacle in the working region based on the location parameter and the image information; and dividing the working region into a plurality of subregions based on the reference information.

According to a second aspect, embodiments of the present disclosure provide an apparatus for constructing a map of a working region for a robot, where the apparatus includes:

a scanning unit, configured to scan an obstacle in a driving path in real time, and record a location parameter of the obstacle;

a camera unit, configured to obtain image information of the obstacle in the driving path in real time;

a determining unit, configured to determine reference information of the obstacle in the working region based on the location parameter and the image information; and a division unit, configured to divide the working region into a plurality of subregions based on the reference information.

According to a third aspect, embodiments of the present disclosure provide an apparatus for constructing a map of a working region for a robot where the apparatus includes a processor and a memory, the memory stores computer program instructions that can be executed by the processor, and the processor executes the computer program instructions to implement the steps of the method according to any one of the foregoing aspects.

According to a fourth aspect, embodiments of the present disclosure provide a robot, including the apparatus according to any one of the foregoing aspects.

According to a fifth aspect, embodiments of the present disclosure provide a non-transitory computer-readable storage medium where the non-transitory computer-readable storage medium stores computer program instructions and the computer program instructions are invoked and executed by a processor to implement the steps of the method according to any one of the foregoing aspects.

BRIEF DESCRIPTION OF DRAWINGS

To describe the technical solutions in the embodiments of the present disclosure or in the existing technology more clearly, the following briefly describes the accompanying drawings needed for describing the embodiments. Apparently, the accompanying drawings in the following description show some embodiments of the present disclosure, and persons of ordinary skill in the art can still derive other drawings from these accompanying drawings without creative efforts.

DESCRIPTION OF EMBODIMENTS

To make the objectives, technical solutions, and advantages of the embodiments of the present disclosure more clear, the following clearly and fully describes the technical solutions in the embodiments of the present disclosure with reference to the accompanying drawings in the embodiments of the present disclosure. Clearly, the described embodiments are merely some but not all of the embodiments of the present disclosure. All other embodiments obtained by persons of ordinary skill in the art based on the embodiments of the present disclosure without creative efforts shall fall within the protection scope of the present disclosure.

It should be understood that, although terms such as "first," "second," and "third" may be used in the embodiments of the present disclosure to describe . . . , the . . . should not be limited by these terms. These terms are merely used to distinguish between the . . . . For example, without departing from the scope of the embodiments of the present disclosure, a first . . . may also be referred to as a second . . . , and similarly, the second . . . may also be referred to as the first . . . .

Figure 5:
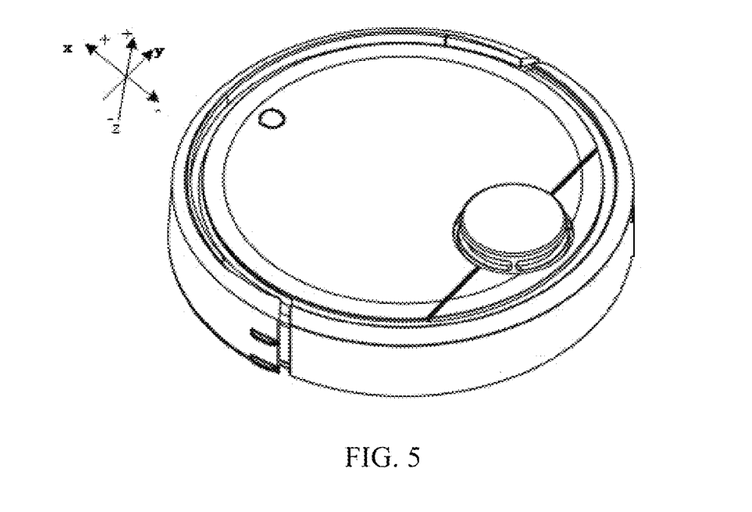
FIG. 5 is a perspective view of a structure of a robot according to some embodiments of the present disclosure.

To describe behavior of the robot more clearly, the following describes definitions of directions:

As shown in FIG. 5, a robot 100 can travel on the floor through various combinations of movement relative to the following three mutually perpendicular axes defined by a main body 110: a front-back axis X, a lateral axis Y, and a central vertical axis Z. The forward driving direction along the front-back axis X is marked as "forward," and the backward driving direction along the front-back axis X is marked as "backward." The lateral axis Y essentially extends between the right and left wheels of the robot along an axial center defined by the center point of the driving wheel module 141.

The robot 100 can rotate around the axis Y. When the forward portion of the robot 100 is tilted upward and the backward portion is tilted downward, "pitch-up" is defined. When the forward portion of the robot 100 is tilted downward and the backward portion is tilted upward, "pitch-down" is defined. In addition, the robot 100 can rotate around the axis Z. In the forward direction of the robot, when the robot 100 tilts to the right of the axis X, "right turn" is defined; and, when the robot 100 tilts to the left of the axis X, "left turn" is defined.

Figure 1:
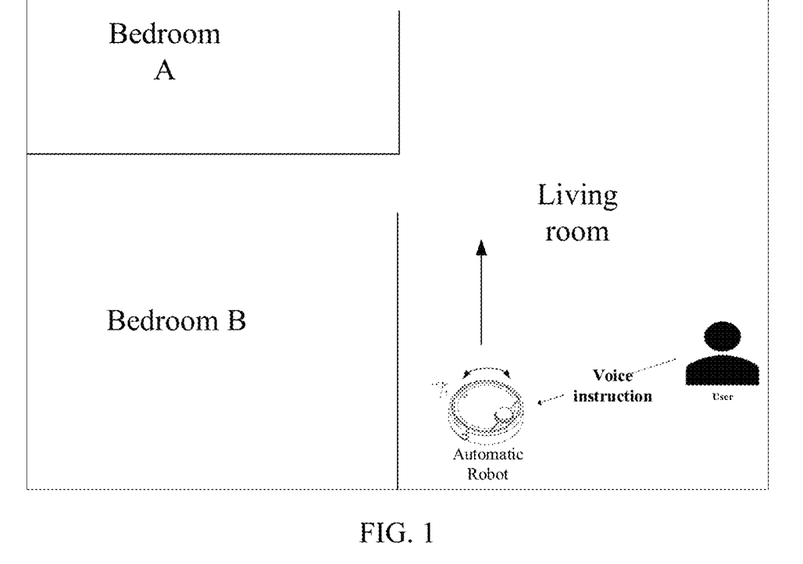
FIG. 1 is a schematic diagram of an application scenario according to some embodiments of the present disclosure.

FIG. 1 shows a possible application scenario according to some embodiments of the present disclosure. The application scenario includes a robot, such as a sweeping robot, a mopping robot, a vacuum cleaner, a weeding machine, etc. In some embodiments, the robot may be a sweeping robot or a mopping robot. During implementation, the robot may be provided with a speech recognition system to receive a voice instruction sent by a user and rotate in a direction of an arrow according to the voice instruction to respond to the voice instruction of the user. In addition, the robot can perform sweeping in the direction indicated by the arrow after responding to the instruction, and scan and photograph a to-be-swept region to obtain map information of a room. The robot may be further provided with a voice-output apparatus to output a voice prompt. In other embodiments, the robot can be provided with a touch-sensitive display to receive an operation instruction input by a user. The robot can be further provided with a wireless communications module such as a WiFi module or a Bluetooth module to connect to an intelligent terminal and can receive an operation instruction transmitted by the user using the intelligent terminal through the wireless communications module.

The structure of the related robot is described as follows, as shown in FIG. 2 to FIG. 5.

The robot 100 includes a machine body 110, a perception system 120, a control system, a driving system 140, a cleaning system, an energy system, and a man-machine interaction system 170.

The machine body 110 includes a forward portion 111 and a backward portion 112 and has an approximate circular shape (both the front and the back are circular) or may have other shapes, including but not limited to the approximate D-shape; that is, the front is straight and the back is circular.

Figure 2:
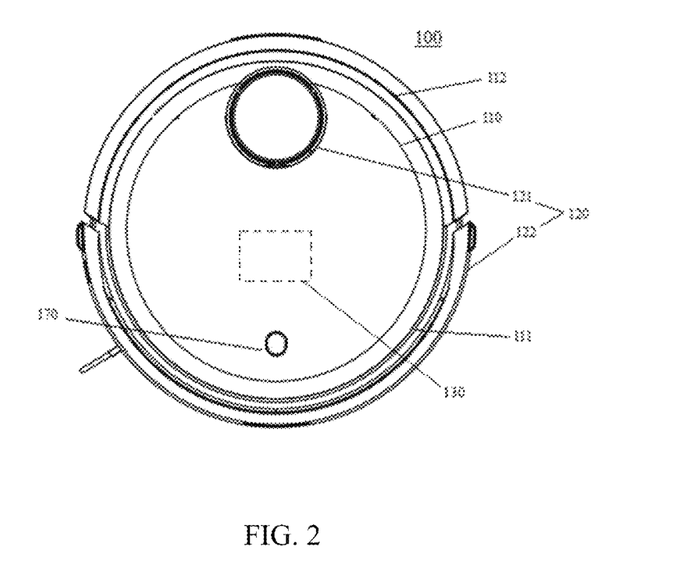
FIG. 2 is a top view of a structure of a robot according to some embodiments of the present disclosure.
Figure 4:
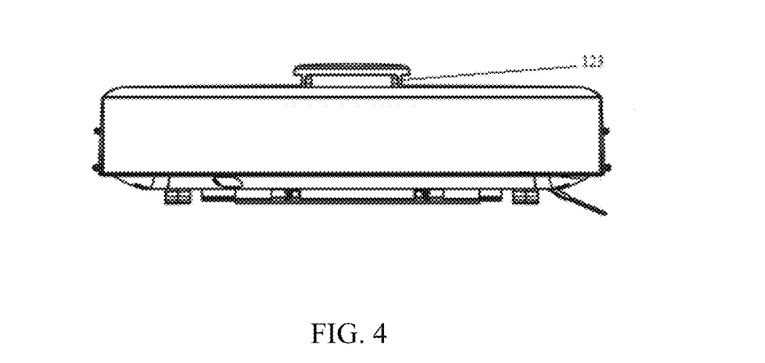
FIG. 4 is a front view of a structure of a robot according to some embodiments of the present disclosure.

As shown in FIG. 2 and FIG. 4, the perception system 120 includes sensing apparatuses such as a location-determining apparatus 121 located in an upper part of the machine body 110, a buffer 122 located in the forward portion 111 of the machine body 110, a cliff sensor 123, an ultrasonic sensor, an infrared sensor, a magnetometer, an accelerometer, a gyroscope, and an odometer, and provides various location information and movement status information of the machine to the control system 130. The location-determining apparatus 121 includes but is not limited to at least one camera and at least one laser distance sensor (LDS). The following describes how to determine a location by using an example of an LDS using a triangular ranging method. The basic principle of the triangular ranging method is based on a proportional relationship between similar triangles. Details are omitted herein for simplicity.

The LDS includes a light-emitting unit and a light-receiving unit. The light-emitting unit may include a light source that emits light, and the light source may include a light-emitting element such as an infrared or visible light-emitting diode (LED) that emits infrared light or visible light. Preferably, the light source may be a light-emitting element that emits a laser beam. In these embodiments, a laser diode (LD) is used as an example of the light source. Specifically, due to monochromatic, directional, and collimation characteristics of the laser beam, a light source using the laser beam can have more accurate measurement than would be the case using another light source. For example, compared with the laser beam, infrared light or visible light emitted by an LED is affected by an ambient factor (for example, a color or texture of an object), and therefore, may have lower measurement accuracy. The LD may be a point laser for measuring two-dimensional location information of an obstacle or may be a line laser for measuring three-dimensional location information of an obstacle within a specific range.

The light-receiving unit may include an image sensor, and a light spot reflected or scattered by an obstacle is formed on the image sensor. The image sensor may be a set of a plurality of unit pixels in one or more rows. The light-receiving element can convert an optical signal into an electrical signal. The image sensor may be a complementary metal-oxide-semiconductor (CMOS) sensor or a charge coupled device (CCD) sensor, and the CMOS sensor is preferred due to the advantage of costs. In addition, the light-receiving unit may include a light-receiving lens component. Light reflected or scattered by an obstacle may travel through the light-receiving lens component to form an image on the image sensor. The light-receiving lens component may include one or more lenses.

A base can support the light-emitting unit and the light-receiving unit, and the light-emitting unit and the light-receiving unit are arranged on the base at a specific distance from each other. In order to measure a status of obstacles in directions from 0 degrees to 360 degrees around the robot, the base can be rotatably arranged on the body 110, or the base may not rotate but a rotation element is arranged to rotate the emitted light and the received light. An optical coupling element and an encoding disk can be arranged to obtain a rotational angular velocity of the rotation element. The optical coupling element senses toothed gaps on the encoding disk and obtains an instantaneous angular velocity by dividing a distance between the toothed gaps by a slip time corresponding to the distance between the toothed gaps. Higher density of toothed gaps on the encoding disk indicates higher accuracy and precision of the measurement, but a more precise structure and a larger calculation amount are needed. On the contrary, lower density of toothed gaps indicates lower accuracy and precision of the measurement, but requires a simpler structure, a smaller calculation amount, and lower costs.

A data processing apparatus, such as a Digital Signal Processor (DSP), connected to the light-receiving unit records obstacle distances of all angles relative to an angle of 0 degree of the robot, and transmits the obstacle distances to a data processing unit, such as an application processor (AP) including a central processing unit (CPU), in the control system 130. The CPU runs a particle filter-based positioning algorithm to obtain a current location of the robot and draws a map based on the location for the use in navigation. The positioning algorithm is preferably simultaneous localization and mapping (SLAM).

Although the LDS based on the triangular ranging method can measure a distance at an infinite distance exceeding a specific distance in principle, the LDS actually can hardly perform measurement for a large distance, for example, over six meters, mainly because the measurement is limited by dimensions of a pixel unit on a sensor of the light-receiving unit and also affected by an optical-to-electrical conversion speed of the sensor, a data transmission speed between the sensor and the connected DSP, and a calculation speed of the DSP. A measured value obtained by the LDS under the action of temperature is also subject to a system-intolerable change, mainly because thermal expansion deformation of a structure between the light-emitting unit and the light-receiving unit causes an angle change between incident light and emitted light, and the light-emitting unit and the light-receiving unit have a temperature drift problem. After the LDS is used for a long time, deformation caused by various factors such as a temperature change and vibration may also greatly affect a measurement result. The accuracy of the measurement result directly determines the accuracy of drawing a map, is the basis for further policy implementation of the robot, and therefore is important.

Figure 3:
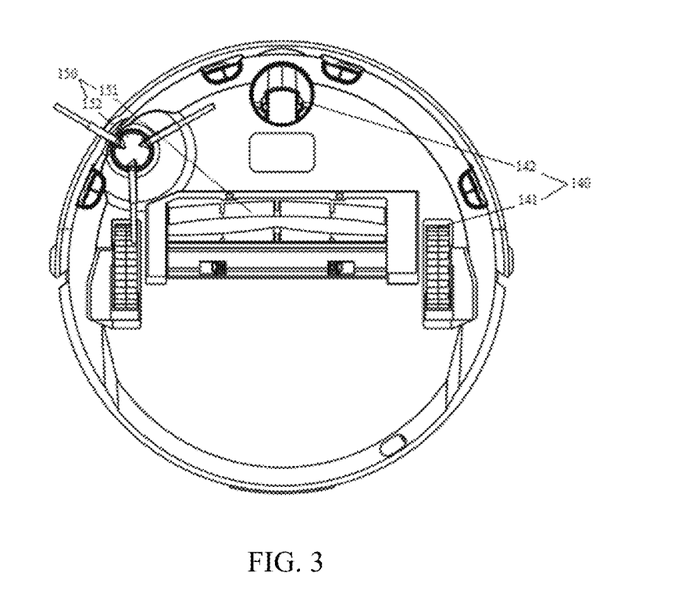
FIG. 3 is a bottom view of a structure of a robot according to some embodiments of the present disclosure.

As shown in FIG. 2 and FIG. 3, the forward portion 111 of the machine body 110 may carry a buffer 122. When the driving wheel module 141 drives the robot to walk on the floor during cleaning, the buffer 122 detects one or more events in the driving path of the robot 100 by using a sensor system, such as an infrared sensor. Based on the events detected by the buffer 122, such as obstacles and walls, the robot can control the driving wheel module 141 to enable the robot to respond to the events, for example, keep away from the obstacles.

The control system 130 is arranged on the main circuit board in the machine body 110. The control system 130 includes non-transient memories such as a hard disk, a flash memory, and a random-access memory (RAM), and computing processors for communication, such as a CPU and an application processor. The application processor draws, based on obstacle information fed back by the LDS and by using a positioning algorithm such as SLAM, an instant map of an environment in which the robot is located. With reference to distance information and velocity information fed back by sensing apparatuses such as the buffer 122, the cliff sensor 123, the ultrasonic sensor, the infrared sensor, the magnetometer, the accelerometer, the gyroscope, and the odometer, the control system 130 comprehensively determines a current working status of the sweeping machine, such as crossing a threshold, walking on a carpet, reaching a cliff, being stuck by the upper part or lower part, full dust box, or being picked up. In addition, the control system 130 provides a specific next-action strategy based on different situations so that the robot better meets the user's requirements, providing better user experience. Further, the control system 130 can plan a most efficient and reasonable sweeping route and sweeping manner based on information about the instant map that is drawn based on SLAM, thereby greatly improving the sweeping efficiency of the robot.

The driving system 140 may control, based on a driving command including distance and angle information such as components x, y, and θ, the robot 100 to move across the floor. The driving system 140 includes a driving wheel module 141. The driving wheel module 141 can control a left wheel and a right wheel simultaneously. To control the movement of the machine more accurately, the driving wheel module 141 preferably includes a left driving wheel module and a right driving wheel module. The left and right driving wheel modules are symmetrically arranged along a lateral axis that is defined by the body 110. To enable the robot to move more stably on the floor or to have a higher movement ability, the robot may include one or more driven wheels 142, and the driven wheels include but are not limited to universal wheels. The driving wheel module includes a traveling wheel, a driving motor, and a control circuit for controlling the driving motor. The driving wheel module can alternatively be connected to a circuit for measuring a drive current or to an odometer. The driving wheel module 141 can be detachably connected to the body 110 for easy assembly, disassembly, and maintenance. The driving wheel may have a biased-to-drop hanging system, which is secured in a movable manner, for example, it is attached to the robot body 110 in a rotatable manner and receives a spring bias that is offset downward and away from the robot body 110. The spring bias allows the driving wheel to maintain contact and traction with the floor by using a specific touchdown force, and a cleaning element of the robot 100 is also in contact with the floor 10 with specific pressure.

The cleaning system may be a dry cleaning system and/or a wet cleaning system. The main cleaning function of the dry cleaning system is derived from a sweeping system 151 that includes a rolling brush, a dust box, a fan, an air outlet, and connecting parts between the four parts. The rolling brush that has certain interference with the floor sweeps rubbish on the floor and rolls the rubbish to the front of a dust suction port between the rolling brush and the dust box, and then the rubbish is sucked into the dust box by airflow that is generated by the fan and that has suction force and passes through the dust box. A dust removal ability of the sweeping robot may be represented by dust pick-up efficiency (DPU). The DPU is affected by the rolling brush structure and a material thereof; by wind power utilization of an air duct including the dust suction port, the dust box, the fan, the air outlet, and the connecting parts between the four parts; and by a type and power of the fan, and therefore, requires a complex system design. The increase in the dust-removal ability is more significant for energy-limited cleaning robots than for conventional plug-in cleaners. A higher dust-removal ability directly and effectively reduces the energy requirement; in other words, a machine that could previously clean 80 square meters of the floor after being charged once can be evolved to clean 100 or more square meters of the floor after being charged once. In addition, as a quantity of charging times decreases, a service life of a battery increases greatly so that frequency of replacing the battery by the user decreases. More intuitively and importantly, a higher dust-removal ability is the most visible and important user experience because it allows the user to directly determine whether the floor is swept/wiped clean. The dry cleaning system may further include a side brush 152 having a rotating shaft. The rotating shaft is located at an angle relative to the floor, so as to move debris into a region of the rolling brush of the cleaning system.

The energy system includes a rechargeable battery, for example, a NiMH battery or a lithium battery. The rechargeable battery can be connected to a charging control circuit, a battery pack-charging temperature-detection circuit, and a battery undervoltage monitoring circuit. The charging control circuit, the battery pack-charging temperature-detection circuit, and the battery undervoltage monitoring circuit are connected to a single-chip microcomputer control circuit. The robot is charged by connecting a charging electrode arranged on a side or a lower part of the machine body to the charging dock. If there is dust on the exposed charging electrode, the plastic part around the electrode may be melted and deformed due to a charge accumulation effect, or even the electrode may be deformed and unable to perform charging normally.

The man-machine interaction system 170 includes buttons on a panel of the robot that are used by the user to select functions; it may further include a display screen, an indicator, and/or a speaker that present the current status of the machine or function options to the user; and may further include a mobile phone client program. For a route-navigated cleaning device, the mobile phone client can show the user a map of the environment in which the device is located, as well as the location of the machine, providing the user with more abundant and user-friendly function options.

Figure 6:
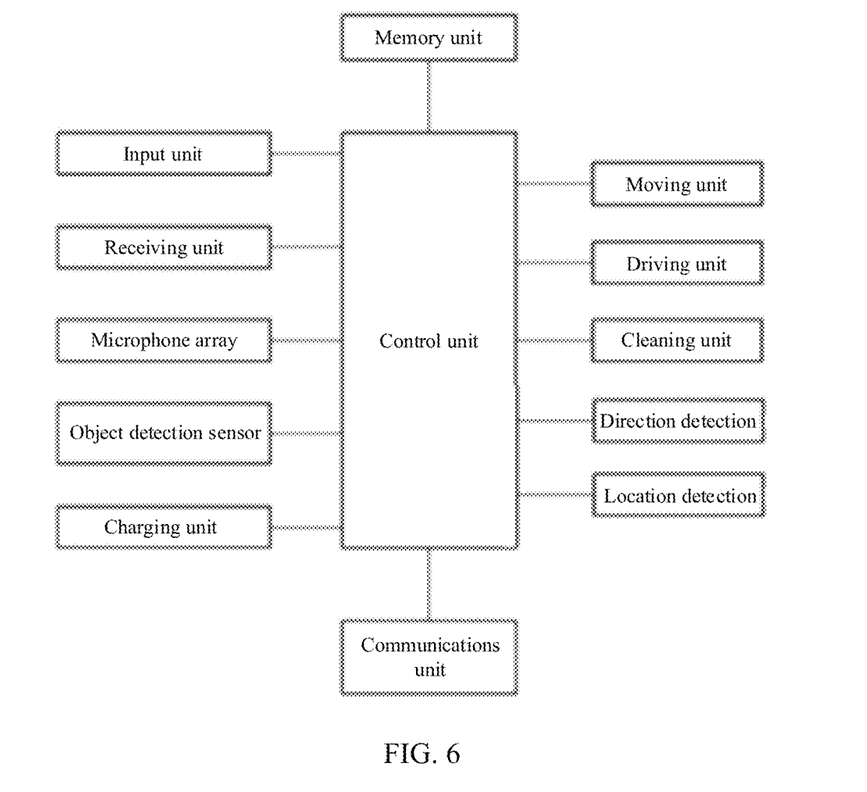
FIG. 6 is a block diagram of a robot according to some embodiments of the present disclosure.

FIG. 6 is a block diagram of a sweeping robot according to the present disclosure.

The sweeping robot according to some embodiments may include a microphone array unit for recognizing a user's voice, a communications unit for communicating with a remote-control device or another device, a moving unit for driving the main body, a cleaning unit, and a memory unit for storing information. An input unit (buttons of the sweeping robot, etc.), an object-detection sensor, a charging unit, the microphone array unit, a direction-detection unit, a location-detection unit, the communications unit, a driving unit, and the memory unit can be connected to a control unit to transmit predetermined information to the control unit or receive predetermined information from the control unit.

The microphone array unit can compare a voice input through a receiving unit with the information stored in the memory unit to determine whether the input voice corresponds to a specific command. If it is determined that the input voice corresponds to the specific command, the corresponding command is transmitted to the control unit. If the detected voice cannot be matched with the information stored in the memory unit, the detected voice can be considered as noise and be ignored.

For example, the detected voice corresponds to the phrases "come over, come here, get here, and arrive here," and there is a text control command (come here) corresponding to the phrases in the information stored in the memory unit. In this case, the corresponding command can be transmitted to the control unit.

The direction-detection unit can detect a direction of the voice by using a time difference or level of the voice that is put into a plurality of receiving units. The direction-detection unit transmits the direction of the detected voice to the control unit. The control unit can determine a driving path by using the voice direction detected by the direction-detection unit.

The location-detection unit can detect coordinates of the main body in the predetermined map information. In some embodiments, information detected by a camera can be compared with the map information stored in the memory unit to detect a current location of the main body. In addition to the camera, the location-detection unit can further use a global positioning system (GPS).

Generally, the location-detection unit can detect whether the main body is arranged at a specific location. For example, the location-detection unit may include a unit for detecting whether the main body is arranged on a charging dock.

For example, in a method for detecting whether the main body is arranged on a charging dock, it can be detected based on whether power is put into the charging unit or whether the main body is arranged at a charging location. For another example, a charging location-detection unit arranged on the main body or the charging dock can be used to detect whether the main body is arranged at the charging location.

The communications unit can transmit/receive predetermined information to/from a remote-control device or another device. The communications unit can update the map information of the sweeping robot.

The driving unit can operate the moving unit and the cleaning unit. The driving unit can move the moving unit along a driving path determined by the control unit.

The memory unit stores predetermined information related to the operation of the sweeping robot. For example, map information of the region in which the sweeping robot is arranged, control-command information corresponding to the voice recognized by the microphone array unit, direction-angle information detected by the direction-detection unit, location information detected by the location-detection unit, and obstacle information detected by the object-detection sensor can be stored in the memory unit.

The control unit can receive information detected by the receiving unit, the camera, and the object-detection sensor. The control unit can recognize the user's voice based on the transmitted information, detect the direction in which the voice occurs, and detect the location of the sweeping robot. In addition, the control unit can further operate the moving unit and the cleaning unit.

Embodiments of the present disclosure provide a method and an apparatus for constructing a map of a working region for a robot, a robot, and a storage medium, so as to enable the robot to clearly divide a map of a working region and accurately go to a designated to-be-swept region for sweeping.

Figure 7:
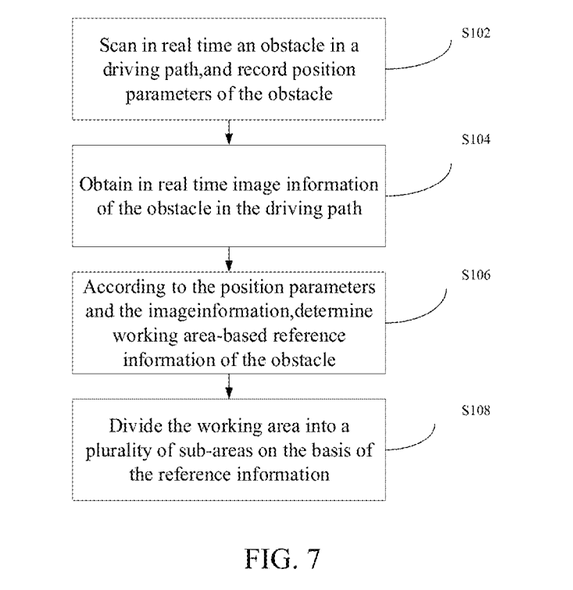
FIG. 7 is a schematic flowchart of a method for constructing a map for a robot according to some embodiments of the present disclosure.

As shown in FIG. 7, according to the robot applied to the application scenario in FIG. 1, the user controls, by using a voice instruction, the robot to execute a related control instruction. Embodiments of the present disclosure provide a method for constructing a map of a working region for a robot, where the method includes the following steps.

In step S102, an obstacle in a driving path is scanned in real time, and a location parameter of the obstacle is recorded.

A sweeping robot receives a user's voice-control instruction and starts to perform a sweeping task. At this time, the sweeping robot does not have a detailed map of the working region, but only performs a basic sweeping task. The sweeping robot obtains obstacle information in the driving path while performing sweeping.

Figure 8:
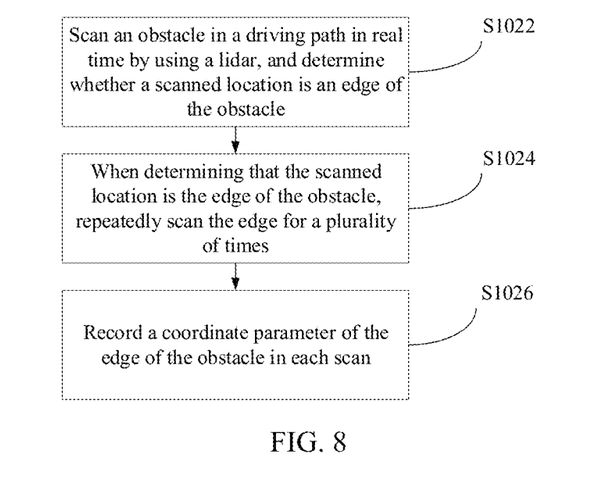
FIG. 8 is a schematic sub-flowchart of a method for constructing a map for a robot according to some embodiments of the present disclosure.

The real-time scanning can be performed using at least one lidar provided on the robot device. The specific hardware structure has been described above, and details are omitted herein for simplicity. As shown in FIG. 8, specific method steps are as follows.

In step S1022, the obstacle in the driving path is scanned in real time by using a lidar, and it is determined whether a scanned location is an edge of the obstacle.

The sweeping robot performs a sweeping task, while in real time the lidar scans obstacles in the driving path, such as walls, beds, etc. When continuing to scan to obtain edge information of the obstacles, for example, the previous continuous scanning detects a wall, and a door frame location is suddenly scanned, the location is determined as a target location, and the robot can perform repeated scanning in situ or nearby to confirm whether the location is the target (door frame) location. When it is determined that an obtained width and height of the scanned location are close to door frame parameters (width and height) stored in a storage device of the robot, the location is determined as the target location. Generally, the door frame has a width of 50 cm-100 cm and a height of 200 cm-240 cm. Therefore, if the corresponding scanned parameters fall into this range, this location is determined as the target location.

In step S1024, when determining that the scanned location is an edge of the obstacle, the edge is repeatedly scanned for a plurality of times.

Based on the foregoing steps, the location is determined as the door frame location, and then the robot repeatedly scans the width and height of the door frame at the location or at a nearby location; that is, the robot performs repeated scanning from different locations and different angles to obtain multiple sets of scanned data. During scanning, the robot can first scan the width of the door frame for a plurality of times to obtain the width data, and then scan the height of the door frame for a plurality of times to obtain the height data of the door frame.

In step S1026, a coordinate parameter of the edge of the obstacle is recorded in each scan.

The foregoing scanning process is also a data recording process. In this case, the data is recorded as a coordinate parameter of the scanned location (door frame). For example, the location of the charging dock is rotated as a coordinate origin, and coordinates of the left door frame in this case are constructed. For example, two-dimensional coordinates are a1 (90, 150), a2 (91, 151), a3 (89, 150), a4 (92, 152), etc. Similarly, the right side of the door frame is scanned to obtain coordinates of the right door frame, for example, b1 (170, 150), b2 (173, 151), b3 (171, 150), b4 (292, 152), etc. Therefore, [a1, b1], [a2, b2], [a3, b3], and [a4, b4] form an array of the widths of the door frame. The calculated widths of the door frame are 80 cm, 82 cm, 82 cm, and 200 cm. Similarly, the coordinate data of the height of the door frame can be obtained, such as c1 (0, 200), c2 (0, 201), c3 (0, 203), c4 (0, 152), etc. The obtained heights of the door frame are 200 cm, 201 cm, 203 cm, 152 cm, etc. The foregoing data is stored in the storage device of the sweeping robot. The actions of sweeping, scanning, recording, and storing continue to be repeatedly performed until the sweeping is completed.

In some possible implementations, after the coordinate parameter of the edge of the obstacle is recorded in each scan, the following calculation method is performed. The calculation method can be used to perform calculation after the sweeping robot returns to the dock for charging. At this time the robot is in an idle state, which is conducive to the processing and analysis of big data. This method is one of the exemplary methods, and the details are as follows.

Firstly, a coordinate parameter that satisfies an adjacent value is selected from multiple sets of coordinate parameters.

For example, the foregoing coordinate parameters a1 (90, 150), a2 (91, 151), a3 (89, 150), and a4 (92, 152) are all adjacent coordinate parameters. Coordinate parameters whose corresponding location coordinate values are within plus- or minus-5 may be determined as adjacent coordinate parameters. In the foregoing coordinate parameters b1 (170, 150), b2 (173, 151), b3 (171, 150), and b4 (292, 152), b4 (292, 152) may be determined as exceeding the adjacent location, and this parameter is excluded from the normal parameter range. Similarly, c4 (0, 152) is also a non-adjacent parameter.

Secondly, the selected coordinate parameters are aggregated.

The aggregation can be performed in a variety of ways, one of which may be, for example, to average parameters of the same location. For example, adjacent values of a1 (90, 150), a2 (91, 151), a3 (89, 150), and a4 (92, 152) are (90+91+89+92)/4=90.5 and (150+151+150+152)/4=150.75, and the adjacent coordinates are a (90.5, 150.75).

Thirdly, the aggregated coordinate parameter is stored in a first array.

For example, the calculated a (90.5, 150.75) is stored as the first array for subsequent retrieval.

In step S104, image information of the obstacle in the driving path is obtained in real time.

A sweeping robot receives a user's voice-control instruction and starts to perform a sweeping task. At this time, the sweeping robot does not have a detailed map of the working region but only performs a basic sweeping task. The sweeping robot obtains obstacle image information in the driving path while performing sweeping.

Figure 9:
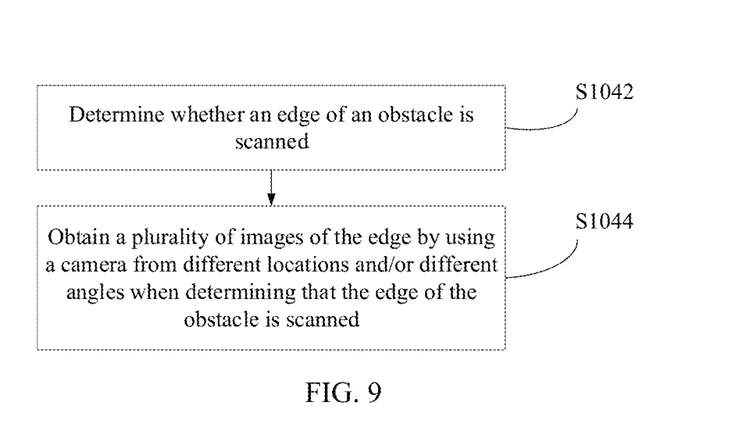
FIG. 9 is a schematic sub-flowchart of a method for constructing a map for a robot according to some embodiments of the present disclosure.

The scanning can be performed using at least one camera device provided on the robot device. The specific hardware structure has been described above, and details are omitted herein for simplicity. As shown in FIG. 9, specific method steps are as follows.

In step S1042, it is determined whether an edge of the obstacle is scanned.

In this step, determining whether the edge of the obstacle is scanned may include invoking a determination result of the scanning radar or performing independent determination based on an image from the camera. Invoking a determination result of the scanning radar is preferred. For example, with reference to the determination of the door frame location in step 1024, photographing by the camera is performed during the repeated scanning by the radar.

In step S1044, a plurality of images of the edge are obtained by using a camera from different locations and/or different angles when determining that the edge of the obstacle is scanned.

After the plurality of images are obtained, the following calculation method may be further performed. The calculation method can be used to perform calculation after the sweeping robot returns to the dock for charging. At this time the robot is in an idle state, which is conducive to the processing and analysis of big data.

Firstly, characteristic lines are extracted from the generated image information.

The characteristic lines are border lines of the door frame, including any characteristic lines determined based on different grayscale values, and the characteristic lines are obtained from images photographed from different angles and different locations.

Secondly, characteristic lines with similar angles and similar locations are categorized into the same group.

The obtained characteristic lines are categorized basically in such a way that characteristic lines located near the same location are categorized into one group, and discrete characteristic lines located far away are categorized into a next group.

Thirdly, when the number of the characteristic lines in the same group exceeds a specific threshold, a marked location is determined.

When the number of the characteristic lines in the same group exceeds a specific threshold, for example, 10 characteristic lines are considered a threshold, the scanned location is determined as a marked location when there are more than 10 characteristic lines. That is, the location is determined as the door frame location. In addition, when a few characteristic lines are categorized into a single group, these characteristic lines may not be inferred as a door. For example, a location with less than 10 characteristic lines is not determined as the door frame location.

Finally, location coordinates of the marked location are recorded and stored in a second array.

For the determined marked location, the coordinate parameter of the location is recorded. As described above, the parameter may be a two-dimensional or three-dimensional coordinate parameter. For example, the coordinate parameter of the door frame is recorded as A (90, 150).

In step S106, reference information of the obstacle in the working region is determined based on the location parameter and the image information.

This determination process is exemplarily performed after the sweeping robot returns to the dock for charging. At this time the robot is in an idle state, which is conducive to the processing and analysis of big data. Details are as follows In this method, a door frame recognition program and a room-segmentation program need to be invoked, using a central control program, to perform corresponding steps.

After the corresponding programs and parameters are invoked, the following steps may be performed:

Firstly, the first array is compared with the second array.

For example, the first array a (90.5, 150.75) and the second array A (90, 150) are described above, and the parameters in the related arrays are compared and analyzed to redetermine whether the parameters are parameters of the same location.

Secondly, when the first array and the second array are close to a specific extent, the edge of the obstacle is determined as a reference location of the working region.

The extent can be set based on experience, for example, set as a value of 3. After the comparison between the first array a (90.5, 150.75) and the second array A (90, 150), 90.5−90=0.5 and 150.75−150=0.75, both of which are within the extent of 3. Therefore, the coordinate location is determined as the door frame location.

Based on the foregoing radar scan data and camera data, the effective double determination makes the determination of the door frame and the like more accurate, facilitating accurate division of a region.

In step S108, the working region is divided into a plurality of subregions based on the reference information.

In some possible implementations, this step includes:

dividing the working region into the plurality of subregions by using the reference information as an entrance to each subregion, and marking the plurality of subregions. For example, the marking includes marking a color and/or a name.

Figure 12:
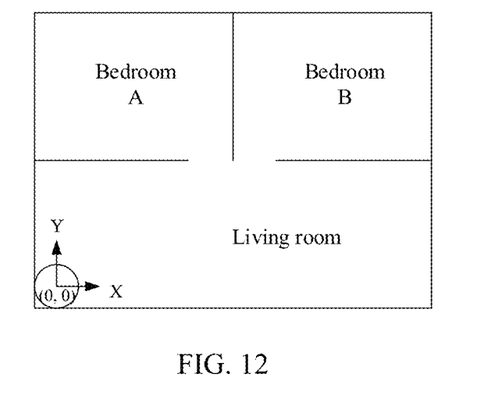
FIG. 12 is a schematic diagram of a result for constructing a map for a robot according to some embodiments of the present disclosure.

Implementing different color configurations for different regions helps color-blind people identify and divide the regions. The user can further edit and save the name of the room in each region, such as the living room, bedroom, kitchen, bathroom, balcony, etc. Before starting the machine the next time, the user can assign the robot to one of the foregoing regions for partial sweeping, as shown in FIG. 12.

The robot provided in the embodiments of the present disclosure can use a lidar to perform two-dimensional scanning and obtain the width data of the door frame with high accuracy. Because the width of the door frame is a predictable range in the room, the sweeping robot recognizes the width through accurate scanning and then marks the width as a preparation for a partitioning point of the room. In addition, to further improve the accuracy, the camera is used to extract and recognize the characteristics of the door, and two sets of data are jointly verified to accurately obtain the location parameters of the door. The room is divided into regions based on the location of the door to form an accurate room layout map. According to the present disclosure, a combination of scanning by the radar and photographing by the camera greatly improves the accuracy of recognizing the room door and avoids confusion in room segmentation caused by incorrectly recognizing the room door.

Figure 10:
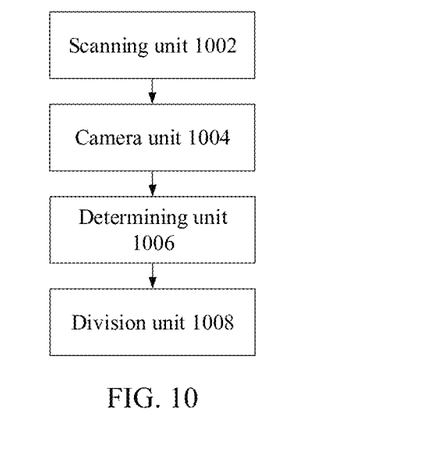
FIG. 10 is a block diagram of an apparatus for constructing a map for a robot according to some other embodiments of the present disclosure.

As shown in FIG. 10, according to the robot applied to the application scenario in FIG. 1, the user, by using a voice instruction, controls the robot to execute a related control instruction. Embodiments of the present disclosure provide an apparatus for constructing a map of a working region for a robot, where the apparatus includes a scanning unit 1002, a camera unit 1004, a determining unit 1006, and a division unit 1008, which are configured to perform the specific steps of the foregoing method. Details are as follows.

The scanning unit 1002 is configured to scan an obstacle in a driving path in real time and record a location parameter of the obstacle.

A sweeping robot receives a user's voice-control instruction and starts to perform a sweeping task. At this time, the sweeping robot does not have a detailed map of the working region but only performs a basic sweeping task. The sweeping robot obtains obstacle information in the driving path while performing sweeping.

The real-time scanning can be performed using at least one lidar provided on the robot device. The specific hardware structure has been described above, and details are omitted herein for simplicity. As shown in FIG. 8, the scanning unit 1002 is further configured to perform the following steps.

In step S1022, the obstacle in the driving path is scanned in real time by using a lidar, and it is determined whether a scanned location is an edge of the obstacle.

The sweeping robot performs a sweeping task, while in real time the lidar scans obstacles in the driving path, such as walls, beds, etc. When continuing to scan to obtain edge information of the obstacles, for example, the previous continuous scanning detects an obstacle wall, and a door frame location is suddenly scanned, the location is determined as a target location, and the robot can perform repeated scanning in situ or nearby to confirm whether the location is the target (door frame) location. When it is determined that an obtained width and height of the scanned location are close to door frame parameters (width and height) stored in a storage device of the robot, the location is determined as the target location. Generally, the door frame has a width of 50 cm-100 cm and a height of 200 cm-240 cm. Therefore, if the corresponding scanning parameters fall into this range, this location is determined as the target location.

In step S1024, when determining that the scanned location is an edge of the obstacle, the edge is repeatedly scanned for a plurality of times.

Based on the foregoing steps, the location is determined as the door frame location, and then the robot repeatedly scans the width and height of the door frame at the location or at a nearby location; that is, it performs repeated scanning from different locations and different angles to obtain multiple sets of scanned data. During scanning, the robot can first scan the width of the door frame for a plurality of times to obtain the width data, and then scan the height of the door frame for a plurality of times to obtain the height data of the door frame.

In step S1026, a coordinate parameter of the edge of the obstacle is recorded in each scan.

The foregoing scanning process is also a data recording process. In this case, the data is recorded as a coordinate parameter of the scanned location (door frame). For example, the location of the charging dock is rotated as a coordinate origin, and coordinates of the left door frame in this case are constructed. For example, two-dimensional coordinates are a1 (90, 150), a2 (91, 151), a3 (89, 150), a4 (92, 152), etc. Similarly, the right side of the door frame is scanned to obtain coordinates of the right door frame, for example, b1 (170, 150), b2 (173, 151), b3 (171, 150), b4 (292, 152), etc. Therefore, [a1, b1], [a2, b2], [a3, b3], and [a4, b4] form an array of the widths of the door frame. The calculated widths of the door frame are 80 cm, 82 cm, 82 cm, and 200 cm. Similarly, the coordinate data of the height of the door frame can be obtained, such as c1 (0, 200), c2 (0, 201), c3 (0, 203), c4 (0, 152), etc. The obtained heights of the door frame are 200 cm, 201 cm, 203 cm, 152 cm, etc. The foregoing data is stored in the storage device of the sweeping robot. The actions of sweeping, scanning, recording, and storing continue to be repeatedly performed until the sweeping is completed.

In some possible implementations, after the coordinate parameter of the edge of the obstacle is recorded in each scan, the following calculation method is performed. The calculation method can be used to perform calculation after the sweeping robot returns to the dock for charging. At this time the robot is in an idle state, which is conducive to the processing and analysis of big data. This method is one of the exemplary methods, and the details are as follows.

Firstly, a coordinate parameter that satisfies an adjacent value is selected from multiple sets of coordinate parameters.

For example, the foregoing coordinate parameters a1 (90, 150), a2 (91, 151), a3 (89, 150), and a4 (92, 152) are all adjacent coordinate parameters. Coordinate parameters whose corresponding location coordinate values are within plus- or minus-5 may be determined as adjacent coordinate parameters. In the foregoing coordinate parameters b1 (170, 150), b2 (173, 151), b3 (171, 150), and b4 (292, 152), b4 (292, 152) may be determined as exceeding the adjacent location, and this parameter is excluded from the normal parameter range. Similarly, c4 (0, 152) is also a non-adjacent parameter.

Secondly, the selected coordinate parameters are aggregated.

The aggregation can be performed in a variety of ways, one of which may be, for example, to average parameters of the same location. For example, adjacent values of a1 (90, 150), a2 (91, 151), a3 (89, 150), and a4 (92, 152) are (90+91+89+92)/4=90.5 and (150+151+150+152)/4=150.75, and the adjacent coordinates are a (90.5, 150.75).

Thirdly, the aggregated coordinate parameter is stored in a first array.

For example, the calculated a (90.5, 150.75) is stored as the first array for subsequent retrieval.

The camera unit 1004 is configured to obtain image information of the obstacle in the driving path in real time.

A sweeping robot receives a user's voice-control instruction and starts to perform a sweeping task. At this time, the sweeping robot does not have a detailed map of the working region but only performs a basic sweeping task. The sweeping robot obtains obstacle image information in the driving path while performing sweeping.

The scanning can be performed using at least one camera device provided on the robot device. The specific hardware structure has been described above, and details are omitted herein for simplicity. As shown in FIG. 9, the camera unit 1004 is further configured to perform the following method steps.

In step S1042, it is determined whether an edge of the obstacle is scanned.

In this step, determining whether the edge of the obstacle is scanned may include invoking a determination result of the scanning radar, or performing independent determination based on an image from the camera. Invoking a determination result of the scanning radar is preferred. For example, with reference to the determination of the door frame location in step 1024, photographing by the camera is performed during the repeated scanning by the radar.

In step S1044, a plurality of images of the edge are obtained by using a camera from different locations and/or different angles when determining that the edge of the obstacle is scanned.

After the plurality of images are obtained, the following calculation method may be further performed. The calculation method can be used to perform calculation after the sweeping robot returns to the dock for charging. At this time the robot is in an idle state, which is conducive to the processing and analysis of big data.

Firstly, characteristic lines are extracted from the generated image information.

The characteristic lines are border lines of the door frame, including any characteristic lines determined based on different grayscale values, and the characteristic lines are obtained from images photographed from different angles and different locations.

Secondly, characteristic lines with similar angles and similar locations are categorized into the same group.

The obtained characteristic lines are categorized basically in such a way that characteristic lines located near the same location are categorized into one group, and discrete characteristic lines located far away are categorized into a next group.

Thirdly, when the number of the characteristic lines in the same group exceeds a specific threshold, a marked location is determined.

When the number of the characteristic lines in the same group exceeds a specific threshold, for example, 10 characteristic lines are considered a threshold, the scanned location is determined as a marked location when there are more than 10 characteristic lines. That is, the location is determined as the door frame location. In addition, when a few characteristic lines are categorized into a single group, these characteristic lines may not be inferred as a door. For example, a location with less than 10 characteristic lines is not determined as the door frame location.

Finally, location coordinates of the marked location are recorded and stored in a second array.

For the determined marked location, the coordinate parameter of the location is recorded. As described above, the parameter may be a two-dimensional or three-dimensional coordinate parameter. For example, the coordinate parameter of the door frame is recorded as A (90, 150).

The determining unit 1006 is configured to determine reference information of the obstacle in the working region based on the location parameter and the image information.

This determination process is exemplarily performed after the sweeping robot returns to the dock for charging. At this time the robot is in an idle state, which is conducive to the processing and analysis of big data. Details are as follows.

In this method, a door frame recognition program and a room-segmentation program need to be invoked, using a central control program, to perform corresponding steps. After the corresponding programs and parameters are invoked, following steps may be performed.

Firstly, the first array is compared with the second array.

For example, the first array a (90.5, 150.75) and the second array A (90, 150) are described above, and the parameters in the related arrays are compared and analyzed to redetermine whether the parameters are parameters of the same location.

Secondly, when the first array and the second array are close to a specific extent, the edge of the obstacle is determined as a reference location of the working region.

The extent can be set based on experience, for example, set as a value of 3. After the comparison between the first array a (90.5, 150.75) and the second array A (90, 150), 90.5−90=0.5 and 150.75−150=0.75, both of which are within the extent of 3. Therefore, the coordinate location is determined as the door frame location.

Based on the foregoing radar scan data and camera data, the effective double determination makes the determination of the door frame and the like more accurate, facilitating accurate division of a region.

The division unit 1008 is configured to divide the working region into a plurality of subregions based on the reference information.

In some possible implementations, the division process specifically includes:

dividing the working region into the plurality of subregions by using the reference information as an entrance to each subregion, and marking the plurality of subregions. For example, the marking includes marking a color and/or a name.

Implementing different color configurations for different regions helps color-blind people identify and divide the regions. The user can further edit and save the name of the room in each region, such as the living room, bedroom, kitchen, bathroom, balcony, etc. Before starting the machine the next time, the user can assign the robot to one of the foregoing regions for partial sweeping.

The robot provided in the embodiments of the present disclosure can use a lidar to perform two-dimensional scanning and obtain the width data of the door frame with high accuracy. Because the width of the door frame is a predictable range in the room, the sweeping robot recognizes the width through accurate scanning and then marks the width as a preparation for a partitioning point of the room. In addition, to further improve the accuracy, the camera is used to extract and recognize the characteristics of the door, and two sets of data are jointly verified to accurately obtain the location parameters of the door. The room is divided into regions based on the location of the door to form an accurate room layout map. According to the present disclosure, a combination of scanning by the radar and photographing by the camera greatly improves the accuracy of recognizing the room door and avoids confusion in room segmentation caused by incorrectly recognizing the room door.

Embodiments of the present disclosure provide an apparatus for constructing a map of a working region for a robot where the apparatus includes a processor and a memory, the memory stores computer program instructions that can be executed by the processor, and the processor executes the computer program instructions to implement the steps of the method according to any one of the foregoing embodiments.

Embodiments of the present disclosure provide a robot, including the apparatus for constructing a map of a working region for a robot according to any one of the foregoing embodiments.

Embodiments of the present disclosure provide a non-transitory computer-readable storage medium where the non-transitory computer-readable storage medium stores computer program instructions and the computer program instructions are invoked and executed by a processor to implement the steps of the method according to any one of the foregoing embodiments.

Figure 11:
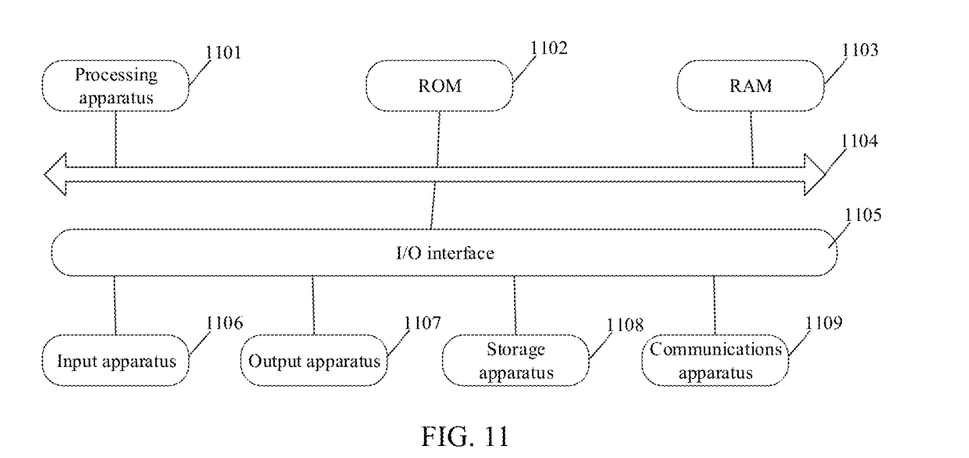
FIG. 11 is an electronic block diagram of a robot according to some embodiments of the present disclosure.

As shown in FIG. 11, the robot 1100 may include a processing apparatus (such as a CPU or a graphics processor) 1101. The processing apparatus 1101 can perform various appropriate actions and processing based on a program that is stored in a read-only memory (ROM) 1102 or a program that is loaded from a storage apparatus 1108 to a RAM 1103. The RAM 1103 further stores various programs and data necessary for operating the electronic robot 1100. The processing apparatus 1101, the ROM 1102, and the RAM 1103 are connected to each other by using a bus 1104. An input/output (I/O) interface 1105 is also connected to the bus 1104.

Generally, apparatuses that can be connected to the I/O interface 1105 include input apparatuses 1106 such as a touchscreen, a touch pad, a keyboard, a mouse, a camera, a microphone, an accelerometer, and a gyroscope; output apparatuses 1107 such as a liquid crystal display, a speaker, and a vibrator; storage apparatuses 1108 such as a magnetic tape and a hard disk; and communications apparatuses 1109. The communications apparatus 1109 can allow the electronic robot 1100 to perform wireless or wired communication with other robots to exchange data. Although FIG. 7 shows the electronic robot 1100 having various apparatuses, it should be understood that not all shown apparatuses need to be implemented or included. More or fewer apparatuses can be implemented or included alternatively.

In particular, according to the embodiments of the present disclosure, the process described above with reference to the flowchart can be implemented as a computer software program. For example, the embodiments of the present disclosure include a computer program product. The computer program product includes a computer program that is carried on a computer-readable medium. The computer program includes program code for performing the method shown in the flowchart. In these embodiments, the computer program can be downloaded and installed from a network by using the communications apparatus 1109, installed from the storage apparatus 1108, or installed from the ROM 1102. When the computer program is executed by the processing apparatus 1101, the foregoing functions defined in the method in the embodiments of the present disclosure are executed.

It should be noted that the foregoing computer-readable medium in the present disclosure may be a computer-readable signal medium or a computer-readable storage medium, or any combination thereof. For example, the computer-readable storage medium may be, but is not limited to, an electrical, magnetic, optical, electromagnetic, infrared, or semiconductor system, apparatus or device, or any combination thereof. More specific examples of the computer-readable storage media may include but are not limited to an electrical connection with one or more conducting wires, a portable computer disk, a hard disk, a RAM, a ROM, an erasable programmable read-only memory (EPROM or flash memory), an optical fiber, a portable compact disk read-only memory (CD-ROM), an optical storage device, and a magnetic storage device, or any suitable combination thereof. In the present disclosure, the computer-readable storage medium may be any tangible medium containing or storing a program. The program may be used by or in combination with an instruction execution system, apparatus, or device. In the present disclosure, the computer-readable signal medium may include a data signal that is propagated in a baseband or as a part of a carrier and carries computer-readable program code. Such propagated data signal may take a plurality of forms, including but not limited to an electromagnetic signal and an optical signal, or any suitable combination thereof. The computer-readable signal medium may also be any computer-readable medium other than the computer-readable storage medium. The computer-readable signal medium can send, propagate, or transmit a program for use by or in combination with an instruction execution system, apparatus, or device. The program code included in the computer-readable medium can be transmitted in any suitable medium, including but not limited to a cable, an optical cable, radio frequency, and the like, or any suitable combination thereof.

The foregoing computer-readable medium may be included in the foregoing robot or may exist alone without being assembled into the robot.

Computer program code for performing an operation of the present disclosure can be written in one or more program design languages or a combination thereof. The program design languages include object-oriented program design languages such as Java, Smalltalk, and C++, and conventional procedural program design languages such as C, or a similar program design language. The program code can be executed entirely on a user computer, partly on a user computer, as a separate software package, partly on a user computer and partly on a remote computer, or entirely on a remote computer or server. In a case involving a remote computer, the remote computer can be connected to a user computer through any type of network, including a local area network or a wide area network. Alternatively, the remote computer can be connected to an external computer (for example, by using an Internet service provider for connection over the Internet).

The flowcharts and block diagrams in the accompanying drawings show the architectures, functions, and operations that may be implemented based on the systems, methods, and computer program products in various embodiments of the present disclosure. In this regard, each block in the flowchart or block diagram may represent one module, one program segment, or one part of code. The module, the program segment, or the part of code includes one or more executable instructions for implementing specified logical functions. It should also be noted that, in some alternative implementations, the functions marked in the blocks can occur in an order different from that marked in the figures. For example, two consecutive blocks can actually be executed in parallel, and sometimes they can also be executed in reverse order, depending on the function involved. It should also be noted that each block in the block diagram and/or flowchart, and a combination of blocks in the block diagram and/or flowchart, can be implemented by using a dedicated hardware-based system that performs a specified function or operation or can be implemented by using a combination of dedicated hardware and computer instructions.

The units described in the embodiments of the present disclosure can be implemented by software or hardware. In some cases, a name of a unit does not constitute a restriction on the unit. For example, a first acquisition unit can also be described as "a unit for obtaining at least two Internet Protocol addresses."

The previously described apparatus embodiments are merely examples. The units described as separate parts may or may not be physically separate, and parts displayed as units may or may not be physical units, may be located at one position, or may be distributed on a plurality of network units. Some or all of the modules may be selected according to actual needs to achieve the objectives of the solutions of the embodiments. Persons of ordinary skill in the art can understand and implement the embodiments of the present disclosure without creative efforts.

Finally, it should be noted that the foregoing embodiments are merely intended for describing the technical solutions in the present disclosure but not for limiting the present disclosure. Although the present disclosure is described in detail with reference to the foregoing embodiments, persons of ordinary skill in the art should understand that they may still make modifications to the technical solutions described in the foregoing embodiments, or make equivalent replacements to some technical features thereof, without departing from the spirit and scope of the technical solutions in the embodiments of the present disclosure.

What is claimed is:

1. A method for dividing a working region for a robot, wherein the method comprises:
    scanning an obstacle in a driving path and recording a location parameter of the obstacle, wherein the location parameter comprises a coordinate parameter of an edge of the obstacle, and obtaining a first array based on the coordinate parameter;
    obtaining image information of the obstacle in the driving path, wherein the image information comprises a plurality of images of the edge, and obtaining a second array based on the plurality of images of the edge;
    determining reference information of the obstacle in the working region based on the location parameter and the image information; and
    dividing the working region into a plurality of subregions based on the reference information,
    wherein said determining comprises:
        comparing the first array and the second array; and
        determining, in response to a difference between the first array and the second array falling within a range, the edge of the obstacle as a reference location of the working region.

2. The method according to claim 1, wherein the scanning an obstacle in a driving path and recording a location parameter of the obstacle comprises:
    scanning the obstacle in the driving path by using a lidar, and determining whether a scanned location is the edge of the obstacle;
    when determining that the scanned location is the edge of the obstacle, repeatedly scanning the edge for a plurality of times; and
    recording the coordinate parameter of the edge of the obstacle in each scan.

3. The method according to claim 2, further comprising:
    selecting coordinate parameters satisfying an adjacent value from multiple sets of the coordinate parameter;
    aggregating the selected coordinate parameters; and
    storing the aggregated coordinate parameters in the first array.

4. The method according to claim 3, wherein the obtaining image information of the obstacle in the driving path comprises:
    determining whether the scanned location is the edge of the obstacle; and
    obtaining the plurality of images of the edge by using a camera from at least one of different locations and different angles when determining that the scanned location is the edge of the obstacle.

5. The method according to claim 4, further comprising:
    extracting characteristic lines from image information obtained based on the plurality of images of the edge;
    categorizing characteristic lines with similar angles and similar locations into a same group;
    when a number of the characteristic lines in the same group exceeds a threshold, determining the scanned location as a marked location; and
    recording a location coordinate of the marked location and storing the location coordinate in a second array.

6. The method according to claim 1, wherein the dividing the working region into a plurality of subregions based on the reference information comprises:
    dividing the working region into the plurality of subregions by using the reference information as an entrance to each subregion; and
    marking the plurality of subregions.

7. The method according to claim 6, wherein the marking comprises marking each subregion with a different color or a different name.

8. A robot for dividing a working region, comprising a processor and a memory, the memory stores computer program instructions that can be executed by the processor, and the processor, when executing the computer program instructions, is configured to:
    scan an obstacle in a driving path, and record a location parameter of the obstacle, wherein the location parameter comprises a coordinate parameter of an edge of the obstacle, and obtain a first array based on the coordinate parameter;
    obtain image information of the obstacle in the driving path, wherein the image information comprises a plurality of images of the edge, and obtain a second array based on the plurality of images of the edge;
    determine reference information of the obstacle in the working region based on the location parameter and the image information; and
    divide the working region into a plurality of subregions based on the reference information,
    wherein the processor is specification configured to:
        compare the first array and the second array; and
        determine, in response to a difference between the first array and the second array falling within a range, the edge of the obstacle as a reference location of the working region.

9. The robot according to claim 8, wherein the processor is further configured to:
    scan the obstacle in the driving path by using a lidar, and determine whether a scanned location is the edge of the obstacle;
    when determining that the scanned location is the edge of the obstacle, repeatedly scan the edge for a plurality of times; and
    record the coordinate parameter of the edge of the obstacle in each scan.

10. The robot according to claim 9, wherein the processor is further configured to:
    select coordinate parameters satisfying an adjacent value from multiple sets of the coordinate parameter;
    aggregate the selected coordinate parameters; and
    store the aggregated coordinate parameters in the first array.

11. The robot according to claim 10, wherein the processor is further configured to:
    determine whether the scanned location is the edge of the obstacle; and
    obtain the plurality of images of the edge by using a camera from at least one of different locations and different angles when determining that the scanned location is the edge of the obstacle.

12. The robot according to claim 11, wherein the processor is further configured to:
    extract characteristic lines from image information obtained based on the plurality of images of the edge;
    categorize characteristic lines with similar angles and similar locations into a same group;
    when a number of the characteristic lines in the same group exceeds a threshold, determine the scanned location as a marked location; and
    record a location coordinate of the marked location and store the location coordinate in a second array.

13. The robot according to claim 8, wherein the processor is further configured to:
divide the working region into the plurality of subregions by using the reference information as an entrance to each subregion; and
mark the plurality of subregions.

14. The robot according to claim 13, wherein the processor is further configured to mark each subregion with a different color or a different name.

15. A non-transitory computer-readable storage medium, configured to store computer program instructions, wherein the computer program instructions are invoked and executed by a processor to implement a method for dividing a working region for a robot, and the method comprises:
scanning an obstacle in a driving path, and recording a location parameter of the obstacle, wherein the location parameter comprises a coordinate parameter of an edge of the obstacle, and obtaining a first array based on the coordinate parameter;
obtaining image information of the obstacle in the driving path, wherein the image information comprises a plurality of images of the edge, and obtaining a second array based on the plurality of images of the edge;
determining reference information of the obstacle in the working region based on the location parameter and the image information; and
dividing the working region into a plurality of subregions based on the reference information,
wherein said determining comprises:
comparing the first array and the second array; and
determining, in response to a difference between the first array and the second array falling within a range, the edge of the obstacle as a reference location of the working region.

* * * * *